(12) United States Patent
Rommelli (10) Patent No.: US 6,170,635 B1
(45) Date of Patent: Jan. 9, 2001

(54) DEVICE FOR HANDLING OBJECTS, FOR EXAMPLE HYGIENIC AND SANITARY ARTICLES

(75) Inventor: Guido Rommelli, Montefino (IT)

(73) Assignee: Fameccania.Data S.p.A., Sambuceto di San Giovanni Teatino (Chieti) (IT)

( * ) Notice: Under 35 U.S.C. 154(b), the term of this patent shall be extended for 0 days.

(21) Appl. No.: 09/252,681

(22) Filed: Feb. 22, 1999

(30) Foreign Application Priority Data

Mar. 19, 1998 (EP) .................................................. 98830153

(51) Int. Cl.$^7$ .................................................. B65G 25/00
(52) U.S. Cl. ........................................ 198/429; 198/463.2
(58) Field of Search ................................. 198/429, 463.2

(56) References Cited

U.S. PATENT DOCUMENTS

| | | | | |
|---|---|---|---|---|
| 1,766,142 | * | 6/1930 | Olsen ................................ | 198/463.2 |
| 3,093,233 | * | 6/1963 | Klenk ................................ | 198/463.2 |
| 3,520,396 | * | 7/1970 | Lingg ................................ | 198/463.2 |
| 3,710,536 |   | 1/1973 | Lee et al. ............................ | 53/24 |
| 4,645,062 | * | 2/1987 | Kopp .................................. | 198/448 |
| 4,681,208 | * | 7/1987 | Harringer et al. .................. | 198/341 |
| 4,902,184 |   | 2/1990 | Fritz .................................. | 414/790 |
| 5,125,496 |   | 6/1992 | Aguirre-Gandara et al. ....... | 198/430 |
| 5,133,446 | * | 7/1992 | Draghetti .......................... | 198/418.5 |
| 5,199,547 | * | 4/1993 | Boldrini et al. ................... | 198/463.2 |
| 5,360,306 | * | 11/1994 | Nakayama et al. ................ | 414/331 |
| 5,460,258 | * | 10/1995 | Tisma ................................ | 198/430 |

FOREIGN PATENT DOCUMENTS

| | | |
|---|---|---|
| 133215 | 12/1978 | (DE) . |
| 0501382 | 9/1992 | (EP) . |
| 0292378 | 11/1998 | (EP) . |

* cited by examiner

Primary Examiner—Christopher P. Ellis
Assistant Examiner—Rashmi Sharma
(74) Attorney, Agent, or Firm—Roylance, Abrams, Berdo & Goodman, LLP (57) ABSTRACT

A device for handling objects or articles capable of receiving at its input a substantially continuous flow of single or multiple articles to be assorted into groups intended to be discharged from the output side in a phased or intermittent manner. The device includes a conveyor for transferring the articles that is provided with appropriate reception seatings for the said articles. The transfer conveyor has an associated expulsion unit capable of acting simultaneously on a group of the said articles contained in the appropriate seatings of the said transfer conveyor maintained in a condition of standstill or substantial standstill. The device also includes an input conveyor that receives a flow of the articles at its upstream end and distributes them into the reception seatings of the said transfer conveyor. The downstream end of the input conveyor is capable of performing a to and fro motion along the transfer conveyor and can thus move the incoming articles into their appropriate seatings, this also as the result of a relative scanning movement within the individual seating, so that a stack of individual products can be formed in that seating. This can be done both when the transfer conveyor is in standstill conditions during the expulsion of a group of articles and when the said transfer conveyor is moving to transfer the articles into the region where they become subject to the action of the expulsion unit.

28 Claims, 5 Drawing Sheets

DEVICE FOR HANDLING OBJECTS, FOR EXAMPLE HYGIENIC AND SANITARY ARTICLES

DESCRIPTION

The present invention relates to a device for handling articles of the type described, for example, in EP-B-0 292 378.

Such devices are currently employed in various sectors of technology, a case in point being the packaging of food products or hygienic and sanitary articles, and, more generally, in all situations in which a so-called object "buffer" has to be employed to absorb any temporary discrepancies between the flow rate of the arriving or incoming articles and the flow rate of the outgoing articles.

These discrepancies may derive (as they do in the example to which extensive reference will be made hereinafter) from the fact that the device receives as its input a practically continuous flow of articles, while the output therefrom operates on an on-off basis and therefore only in distinct intervals, for example when it discharges at a predetermined rhythm groups of articles that are arranged together with a view to some subsequent processing operation (for example, in a packaging station, possible after appropriate compaction).

In the solutions known to the state of the art, including the one described in the previously cited document, the length of the tract of the conveyor that forms the buffer (and in practice therefore also the number of articles that can be contained in the buffer) is made to vary by realizing an overall translation of the conveyor structure. The effect thereby obtained is that of varying the length of the active branch of the conveyor comprised between the loading station and the discharge station, these two stations being maintained in fixed positions. The principal critical aspects of the functioning of these known devices are essentially bound up with the objective difficulty of ensuring an exact phasing (cadencing) of the functioning of the device, this especially in relation to the incoming flow of articles and the need for moving the entire structure of the conveyor, with all the intrinsic problems of inertia and wear and tear necessarily associated with this action. These intrinsic limitations become more and more evident as the speed at which the device is expected to operate becomes greater. Another drawback associated with the solutions known to the state of the art derives from the difficulty that is experienced when so-called "format changes" have to be made, that is to say, when the device has to be adapted for processing different articles and/or realizing different assortment functions.

In a more specific manner the present invention relates to a device in accordance with the preamble of Claim 1 hereinbelow, known—for example—from EP-A-0 501 382. Though coming to grips to a certain extent with some of the problems that have just been outlined, the said known device is intrinsically unsuitable for operating at high speeds and/or in situations in which each of the articles that are being handled is itself made up of a plurality of products. As regards the reference to high operating speeds and referring to the application example extensively described hereinafter (which is not, however, to be considered as in any way limiting the range of the invention), a device in accordance with the present invention can be used as a grouper intended to receive an input flow of, say, 1200–1500 units per minute of such articles as ladies' sanitary towels that have to be grouped and compacted into piles that are to be sent, for example, to a packaging machine, with each pile containing ten articles, so that the output flow rate will be 120–150 piles per minute.

The present invention seeks to eliminate the aforesaid drawbacks by eliminating the need for keeping the principal machine in phase with the grouping device and, at one and the same time, making it possible to obtain the previously mentioned high operating speeds without this having any negative effects on the life and reliability of the mechanical components of the device.

According to the present invention, this scope can be attained thanks to a device having the characteristics that will subsequently be described.

The invention will now be described, though only as an example not to be considered as limitative in any manner or wise, by reference to the drawings attached hereto, where.

As already noted, the structure and the functioning of an implementation example of the invention will subsequently be illustrated (in relation to FIGS. 1 to 7) by reference to a device that is intended to act as a grouper of hygienic and sanitary articles, ladies' sanitary towels being a case in point. With the sole exception of a group of articles intended for compaction and illustrated in FIG. 2, these articles A are not shown in FIGS. 1 and 2.

Figure 1:
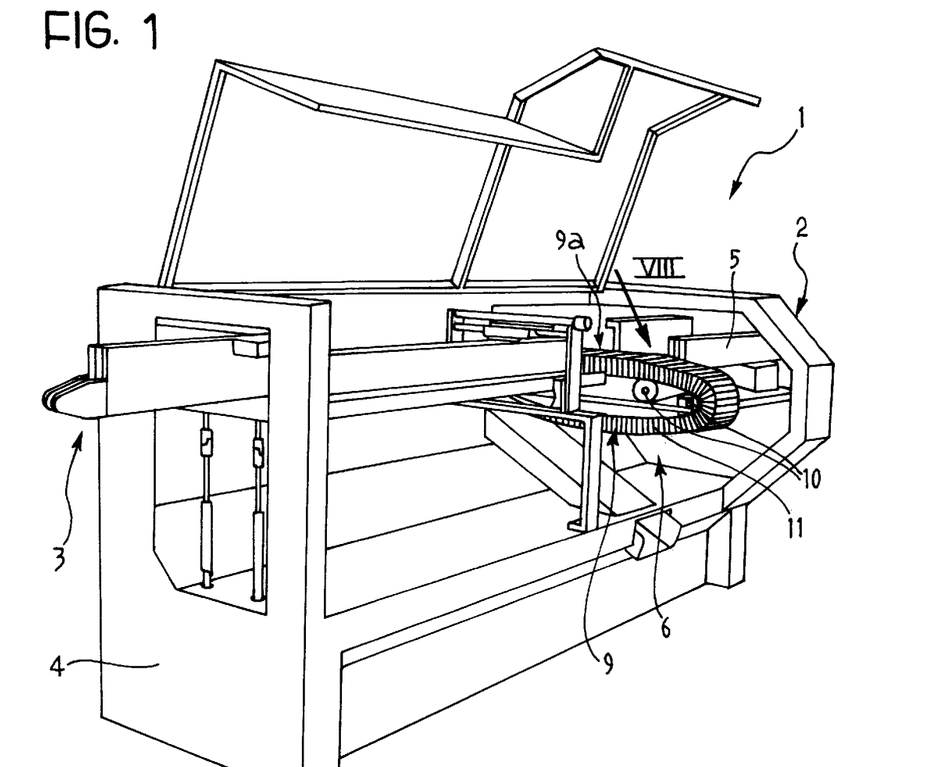
FIG. 1 shows a general perspective view of the device according to the invention.
Figure 2:
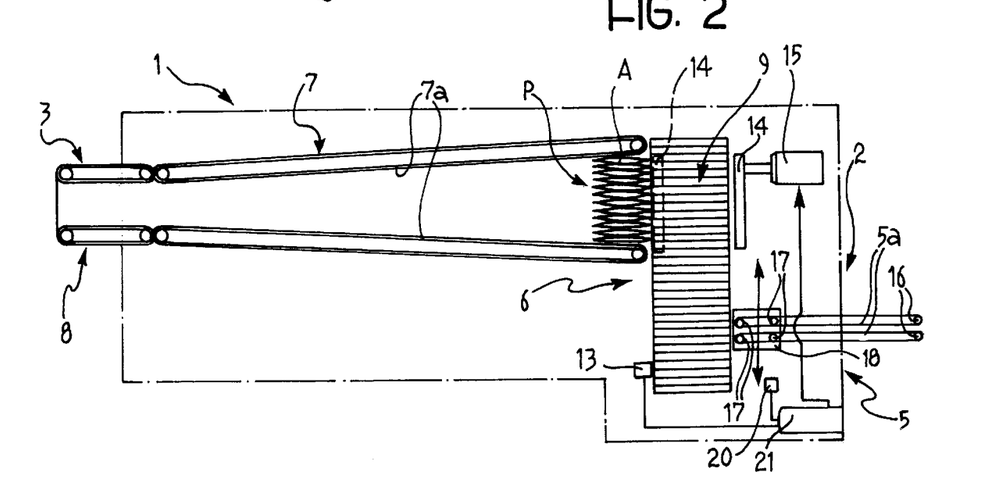
FIG. 2 shows a plan view of the device of FIG. 1, FIGS. 3 to 7 illustrate the operating cycle of the device according to the invention in a partial and intentionally schematic plan view.

More specifically, the device 1 is intended to operate between an input end 2 and an output end 3 located, respectively, to the left and the right according to the direction from which FIGS. 1 and 2 are viewed. The terms "input" and "output" are of course referred to the flow direction of the articles A, which is here likewise supposed to take place from the right to the left in FIGS. 1 and 2.

In the implementation example here considered, the device 1 comprises a supporting structure 4 that consists of, for example, a solid bench realized in accordance with modern structural steelwork techniques. On the structure 4 there are mounted (in accordance with known criteria) motor-operated conveyors or groups of such conveyors, which may be of—for example—the belt or band type and constitute the input end 2 and the output and 3, as well as all the other organs situated between these two ends.

More specifically, the reference number 5 indicates a first conveyor (or input conveyor) consisting of a pair of belts or bands operated by means of motors (via motor organs of a known type not shown on the drawings) extending with their respective active branches 5a—vertically orientated and placed side by side—in such a way as to jointly define a gripping and dragging range for the incoming article flow. Henceforth in the present description it will be assumed that these articles are constituted by sanitary towels A for ladies that are fed towards the input end 2 of the device 1 in a continuous flow of articles that move forward one behind the other, typically arranged "edgewise and upright", that is to say, in such a way that their flat faces and shorter sides lie in a vertical plane and the longer sides of the face are parallel to the line of motion.

One may assume that such a flow of articles (at a rather high flow rate, which may be—for example—of the order of 1200–1500 articles per minute) to becoming sanitary towel production line (not shown) located to the right with respect to the device 1 when the arrangement is viewed as in FIGS. 1 and 2.

The incoming articles will therefore be inserted (in accordance with known criteria) in the space comprised between the two active branches 5a of the belts or bands of the conveyor 5 to be moved forward within the device 1 towards a grouping device that in its entirety is indicated by the reference number 6.

The unit 6, of which the structural characteristics and the operating mode will be described in greater detail further on, especially by reference to FIGS. 3 to 7, is designed to feed groups or piles of articles A placed side by side towards the output end 3 of the device 1. With a view to clarifying ideas, always in relation to articles A that of ladies' sanitary towels, one may suppose that the grouping unit 6 periodically feeds piles or groups P of articles A grouped together. In a practical application context such a pile may comprise, for example, ten articles A: for the sake of simplicity of illustration, however, it is assumed in FIGS. 3 to 7 that the piles in question are formed by grouping six articles.

FIGS. 1 and 2 show that the output end 3 of the device 1 consists—in the implementation example here considered—of a further conveyor or group of conveyors 7, 8 that—again in the example here considered—is or are structurally similar to the previously described conveyor 5.

In particular, the conveyor 7, which receives the piles P of articles A arriving from the grouping unit 6, once again consists of two belts or bands that are operated by motors (via means of a known type that are not shown on the drawings) that present their respective active branches 7a with a vertical orientation and placed side by side in such a manner as to be capable of receiving within them the piles P and thus moving them from the grouping unit 6 towards the output end 3.

Further examination of FIG. 2 shows that the two active branches 7a of the conveyor 7 are preferably not arranged parallel to each other. They are rather made to converge towards each other, thereby ensuring that as the article piles P are moved forward from the grouping unit 6 towards the output end 3 (constituted—in the implementation example here considered—by a further motor-operated belt or band conveyor 8 of a generally known type), they will also become subjected to a compacting action, this in the sense that the articles A in the pile P will become compressed in a direction perpendicular to the plane in which they are lying.

It is wholly obvious that this compaction operation constitutes a preferential but not imperative characteristic of the device according to the invention. The fact that the articles A in the piles P become subjected to a compacting action as they move towards the output end 3 is intended to facilitate the subsequent packaging of the articles A (which takes place in a packaging machine, not shown, but may be supposed to be situated to the left of the device 1 as viewed in FIGS. 1 and 2) by reducing the overall volume of the articles A. It will readily be appreciated that the articles A explicitly referred to hereinabove (ladies' sanitary towels) are characterized, especially on account of the presence of their respective absorptive cores, by a certain compressibility, though this may vary according to the particular properties of the article.

The grouping unit 6 comprises the conveyor 9 as its principal element, which in its turn consists of a flexible body that in the manner of a ring envelops the respective rollers or groups of return rollers that are jointly indicated by the reference number 10 in FIG. 1.

The body in question is provided on its outside (with respect to the envelopment trajectory) with projecting baffles or fins 11 and successive pairs of adjacent fins or baffles define receptacles 12 intended to receive the articles A arriving from the input conveyor 5 for the purpose of their subsequent transfer to the conveyor 7.

In the implementation form preferred at this moment, the baffles or fins 11 are mounted and in any case provided on the conveyor 9 in such a way as to extend in the direction orthogonal to the direction of motion of the upper and lower branches of the conveyor 9 and therefore in a direction substantially parallel to the direction of motion of the articles A on the input conveyor 5 and the conveyor 7 that collects the piles P of articles A from the grouping unit 6.

The conveyor 9 consists preferably of an articulated structure that is to all intents and purposes similar to a chain of which the links are represented by the root parts of the baffles 11, which are articulated with respect to each other thanks to the presence of complementary hinge parts between them.

Examination of FIG. 1 shows that the conveyor 9 is mounted on the structure 4 in such a way as to present an upper or active branch 9a intended to realize the transfer of the articles A introduced into the receptacles 12 from the conveyor 5 (input position) to the conveyor 7 (output position).

The motion of the transfer band 9 is realized by means of motors (of a known type) that are shown schematically, though in FIG. 2 only, and indicated by the reference number 13.

Unlike what happens, for example, in the solution described in EP-A-0 292 378, where the article transfer conveyor is made in such a way as to be moved physically sideways with respect to the fixed input and output position of the articles A, the solution according to the invention is such that the conveyor 9 is mounted on the structure 4 in a fixed position, this in the sense that (obviously without prejudice to the possibility of realizing the necessary transfer of the products A by virtue of the forward motion of the active branch 9a) the whole of the conveyor 9 is maintained in a fixed position with respect to the structure 4, the same being true also as regards the conveyor 7.

This arrangement makes it possible for a pusher device 14, which acts as an expulsion organ and can be likened to a kind of rake or wiper, to intervene simultaneously on a certain group of articles A contained in the beds 12 of the tract of the active branch 9a of the conveyor 9 at that particular moment facing the input end of the conveyor 7. The pusher can thus expel from the transfer conveyor 9 (see the two positions of the pusher element 14 shown in FIG. 2 and represented, respectively, by full and broken lines) a group of articles A that are intended to form a pile P. In particular, the articles A in question are expelled by causing them to leave their respective beds 12 and to move into the input end of the conveyor 7 placed back to back, thus realizing the necessary grouping action.

As can be seen more readily in FIG. 2 (and also in FIGS. 3 to 7), the pusher element 14 faces the active branch 9a of the conveyor 9 in exactly the same position as the input end of the conveyor 7, though normally on the opposite side of the conveyor 9.

Figures 3, 4, 5:
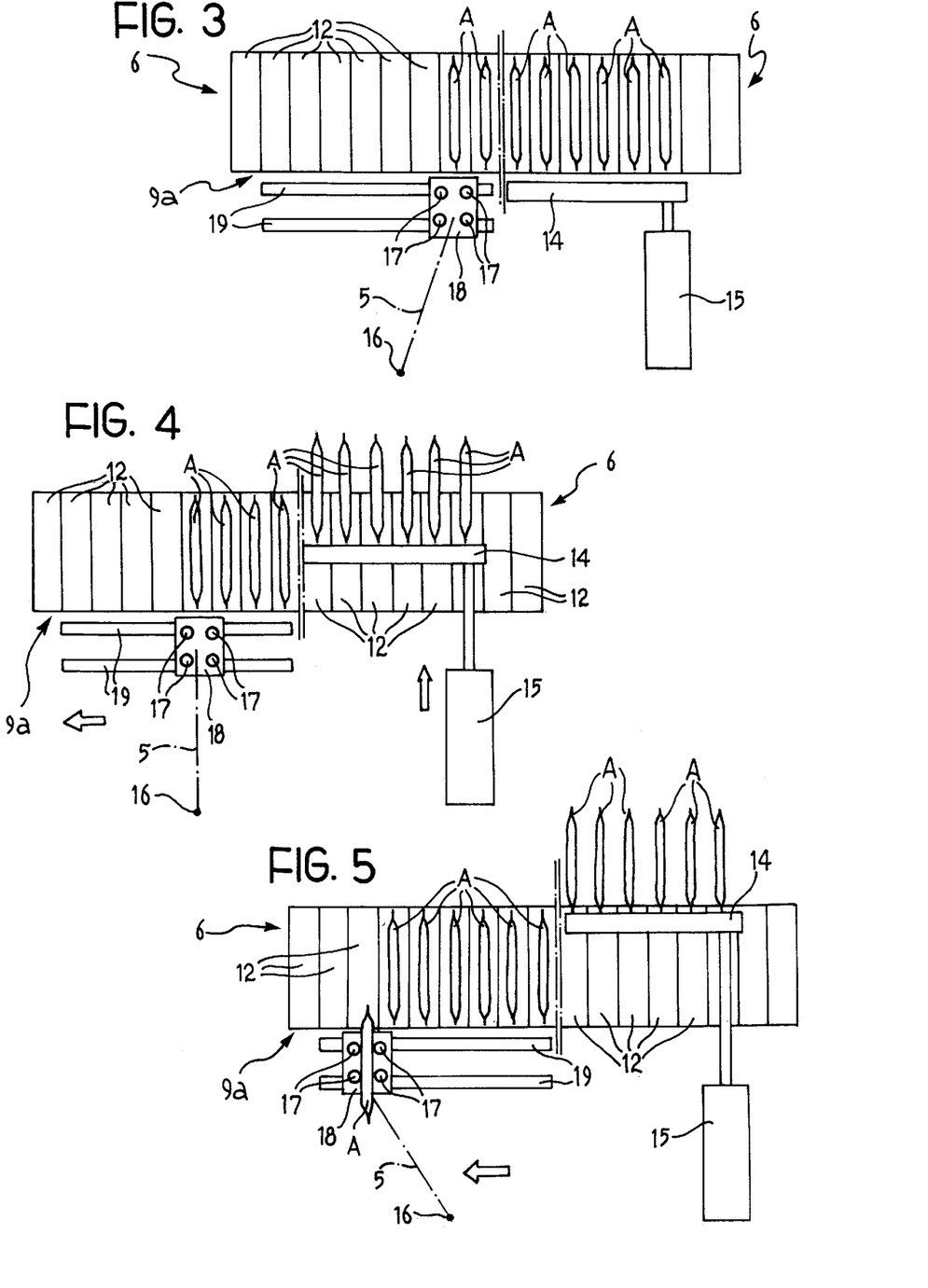

With specific reference to the attached drawings, the sideways movement of the pusher element 14 is generically realized in a transverse direction with respect to the active branch 9a of the conveyor 9 and between:

a retracted position, in which it is detached from the active branch 9a and the articles A contained therein, shown by means of full lines in FIG. 2 and FIGS. 3, 6 and 7, and a maximum forward position (complete expulsion of the articles A from the beds 12 of the active branch 9a) represented by means of broken lines in FIG. 2 and also in FIG. 5.

This movement, which of course also envisages a series of intermediate positions, the one shown in FIG. 4 being a case in point, is realized under the action of a driving device 15 consisting, for example, of a mechanical pusher operated by, for example, an electric motor, preferably via a cam such as to ensure that the pushing action that the element 14 exerts on the articles A will be realized in a gradual and jerk-free manner, followed by a rapid return of the element 14 to its initial position as soon as the articles A have been expelled from the conveyor. Preferably, moreover, the element 14 is mounted on the driving device 15 in a detachable manner. This will make possible the selective mounting on the driving device of elements 14 of different widths and corresponding in each case to the space occupied by the group or pile P of articles A to be expelled.

Examination of FIGS. 3 to 7 clearly brings out a feature of the invention that proves to be particularly useful in making it possible for the device to be operated at high speeds, namely the fact that the operation of loading the articles A into the beds 12 (see, for example, FIGS. 5—on the left—and 7) and the subsequent operation of discharging the articles A from the said beds 12 (see for example, FIGS. 4 and 5—on the right) are realized in the same direction, that is to say, without inverting the direction of translation of the articles as happens in the case of the solution described in EP-A-0 501 382. It will also be noted that, operating in the manner illustrated in FIGS. 3 to 7, the articles A preserve their orientation wholly unchanged throughout the handling operations.

Furthermore, unlike what happens in the case of the conveyor 7, arranged in a position that is wholly fixed with respect to the structure 4, the conveyor 5 is mounted on the device 1 in such a manner as to be able to perform an ample traversing motion that will permit its downstream end (where downstream is used in its natural meaning to indicate the forward motion of the articles A) to follow the forward motion of the active branch 9a of the belt 9 acting as conveyor that transfers the articles A to the conveyor 7.

For the sake of simplicity one may here imagine that the return elements 16 (generally rollers) defining the upstream end of the conveyor 5 are mounted in a fixed position with respect to the base 4, while the corresponding elements on the downstream side, jointly indicated by the reference number 17 (it has here been assumed that the return of the downstream end of the belts of the conveyor 5 is realized by means of vertical-axis roller pairs, an arrangement that confers greater stability upon the terminal tracts of the active branches Sa) are mounted on a sliding trolley 18.

The trolley 18, preferably realized with material of low inertia (for example: a composite carbon fibre material) can move on a series of guides 19 that extend parallel to (and coextensive with) at least one appropriate tract of the active branch 9a of the belt 9. The movement of the trolley 18 is realized under the action of an appropriate driving device constituted, for example, by a linear motor 20 (which is shown explicitly only in FIG. 2).

The rollers 17 (and therefore the downstream ends of the input conveyor 5) are thus in a position to perform a to and fro motion in a sideways direction, i.e. parallel to the active branch 9a of the belt 9, as indicated by the double-headed arrow in FIG. 2 and inferable from the various positions of the trolley shown in FIGS. 3 to 7. In the latter figures, moreover, the general traversing motion of the input conveyor 5 has been represented by a line consisting of dashes and dots. The center of this traversing motion has been ideally indicated by the reference number 16, which in FIG. 2 identifies the return elements that define the upstream end of the conveyor 5.

In this connection it will be appreciated that the conveyor 9 and the conveyor 5 are in actual practice kinematically uncoupled, i.e. independent of each other, this in the sense that their coordinated movement (in terms that will be explained in greater detail further on) is obtained by virtue of the coordinated control of their respective driving motors 13 and 20, which are in any case separate and distinct from each other. This represents another significant element of difference as compared with the solution described in EP-A-0 501 382, where the described oscillating conveyor is coupled (by means of the gearing of a sprocket wheel) with the principal conveyor of the device, so that in actual practice it is dragged along by the latter.

With a view to facilitating the insertion of the articles A into the beds 12, a roller or similar supporting element (not explicitly shown on the drawings, but to all intents and purposes capable of being identified with the roller 10 in the higher position in FIG. 1) may be mounted on the trolley 18 for the purpose of maintaining in a slightly raised position the baffle of the tract of the branch 9a of the conveyor 9 at that moment facing the downstream end of the conveyor 5. The action of the element in question (which is mounted on the trolley 18 and therefore follows its traversing motion) has the effect of slightly divaricating the baffles or fins 11 between which the article A at that moment fed onto the trolley 18 has to be inserted.

The operation of the three principal motor organs shown in FIG. 2, namely:

the motor 13 of the transfer conveyor 9,
the driving device 15 that controls the movement of the pusher element 14, and
the motor 20 that controls the movement of the trolley 18 on the guides 19, is controlled in an coordinated manner by a control unit 21 consisting of, for example, a so-called PLC (acronym of "programmable logic controller") or similar processing unit capable of synchronizing the movements of the various mobile elements and thus obtaining (in accordance with the so-called "electric axis" principle, for example) the desired functionalities.

The criteria for programming the operation of such a control unit in keeping with the motions that have to be executed have to be considered as being well known to any person appropriately skilled in programming the operation of automatic machinery. These criteria will not therefore be specifically discussed hereinbelow, not least because they are not in themselves relevant for the purposes of understanding the invention. This also applies as regards the control (normally coordinated by the same control unit 21) of the operation of the other motor units normally comprised in the device 1, which include, among others, the driving units of the bands or belts of the conveyors 5, 7 and 8. In this connection it will be sufficient to recall that the driving unit of the input conveyor 5 is operated in such a manner as to be synchronized with the input flow of the articles A, thereby ensuring a conveyor speed (at least) equal to the product of the length of each individual article A and the number of such articles arriving in unit time, though naturally taking due account of the preferable need for ensuring a certain spacing between successive articles. And, further, providing also the degree of synchronization with the driving units 13 and 20 required to ensure that each individual article A, after being transferred from the output end of the conveyor 5 to inside one of the receptacles 12, will properly aligned within this receptacle and not interfere with the fins or baffles 11. In fact, the seatings 12 for the articles A formed by the baffles 11 possess the general configuration of a channel and permit the incoming articles A to slide in a direction that is generically transverse with respect to the motion of the active branch 9a of the conveyor 9.

What has just been said applies particularly to the operating situations in which it becomes necessary to invert the direction of motion of the trolley 18. Even though this trolley is made of low-inertia material, the motion reversal process must necessarily take due account of inertia effects and provide appropriate deceleration, arrest and acceleration phases of the motion of the trolley 18, and this in such a manner as not to prejudice the necessary phasing with the movement of the active branch 9a of the conveyor 9.

The operation of the output conveyor, on the other hand, is related to the frequency with which the piles P are formed and therefore the number of articles A contained in each pile in such a manner as to enable the conveyor to accept the piles P at the moment when they are expelled from the transfer conveyor 9 as a result of the forward motion of the pusher element 14, and the conveyor 7 may therefore be operated either in an intermittent or—preferably—a continuous manner.

The criteria that regulate the coordinated operation of the conveyor 9 (forward motion of the active branch 9a), the linear motor 20 which operates the trolley 18 and the pusher element 14 can be more readily understood by referring to the sequence of FIGS. 3 to 7.

With a view to fixing the idea, it has been supposed in all these figures that articles A arriving on the input conveyor 5 are fed to the transfer conveyor 9—one at a time—in the position of the active part 9a shown on the left-hand side of the figures. All this with a view to their eventual expulsion in groups (to simplify illustration, it has here been assumed that each group and therefore each pile P comprises six articles A, even though this number will be different in the preferred applications: for example, ten articles A) by the pusher element 14, which expels the groups of articles A in the position corresponding to the part of the active branch 9a shown on the right-hand side of the figures.

Likewise with a view to simplifying illustration, it has also been supposed (naturally on the assumption of representing the regular and continuous operation of the device 1) that the starting condition is the one shown in FIG. 3. In this case the pusher element 14 is in its retracted position and in front of it, ready to be pushed onto the conveyor 7, there is a group of articles A (of which there are six in the simplified implementation example used for illustration purposes). Before the pusher element 14 can perform its pushing action (see the intermediate pusher position shown in FIG. 4), it is essential that the active branch 9a, which in relation to the observer of FIGS. 3 to 7 moves from the left to the right, is brought "into a condition of substantial standstill", where this expression is to be understood as indicating arrest in the proper sense of the term and/or at least a considerable speed reduction (for example, a so-called "pendulation") in a condition very close to standstill.

The need for absorbing the flow of the articles A that keep arriving as input is satisfied by arranging matters in such a way that the trolley 18 carrying the downstream end 17 of the input conveyor 5 will at that moment find itself in a position close to the extreme forward limit of its traversing motion towards the pusher element 14 (that is to say, towards the output position represented by the conveyor 7).

In these conditions, moving gradually away from the pusher element 14 and therefore also from the output conveyor 7 (see the position shown in FIG. 4), the input conveyor 5 will be able to distribute the incoming articles A into the receptacles 12 of the active branch 9a available upstream of the output tract at that moment subjected to the expulsion action of the pusher element 14.

It will also be appreciated—as ideally indicated by the break line drawn across the active branch 9a in FIG. 3 to 7—it is not in any way necessary for the aforesaid action of absorbing the incoming flow of articles A to be performed by using the beds 12 immediately upstream of the beds 12 that contain the articles A to be expelled. It is quite obvious, in fact, that the zone in which the pusher element 14 is acting and the zone of action of the downstream end of the input conveyor 5 may be separated by a tract of the active branch 9a consisting of any number of beds 12 (though naturally already occupied by articles A). The presence of such an intermediate tract of the active branch 9a (and the corresponding articles A) will not have any effect whatsoever on the regular and continuous operation of the device 1, always provided, of course, that due account be taken of the presence of this intermediate tract when the device 1 is set in motion.

If we now return to the sequence of FIGS. 3 to 7, we may note that the pusher element 14, passing from the condition shown in FIG. 4 to the position illustrated by FIG. 5, completes the motion by which it expels the group of (six) articles A that are to form the pile P onto the conveyor 7. While it does so, the trolley 18 that carries the downstream end of the conveyor 5, continuing its backward motion along the guides 19, has arrived in a position close to the one in which it is furthest removed from the output position (pusher element 14 and output conveyor 7), performing also the action of loading an article A into the appropriate bed 12 of the active branch 9a (which at that moment is supposed to be substantially standing still).

At this point the driving device 15 is controlled by the unit 21 in such a way as to return to its rest position, while the motor 13 is set in motion again and thus causes the active branch 9a of the transfer belt 9 to move forward to the output position, that is to say, the region in which the pusher element 14 is operating.

Figure 6:
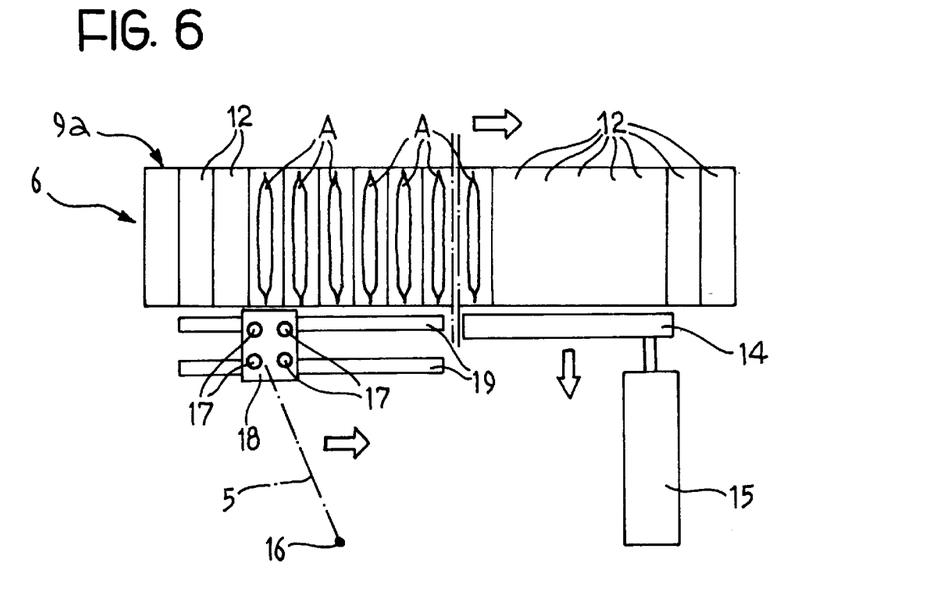
Figure 7:
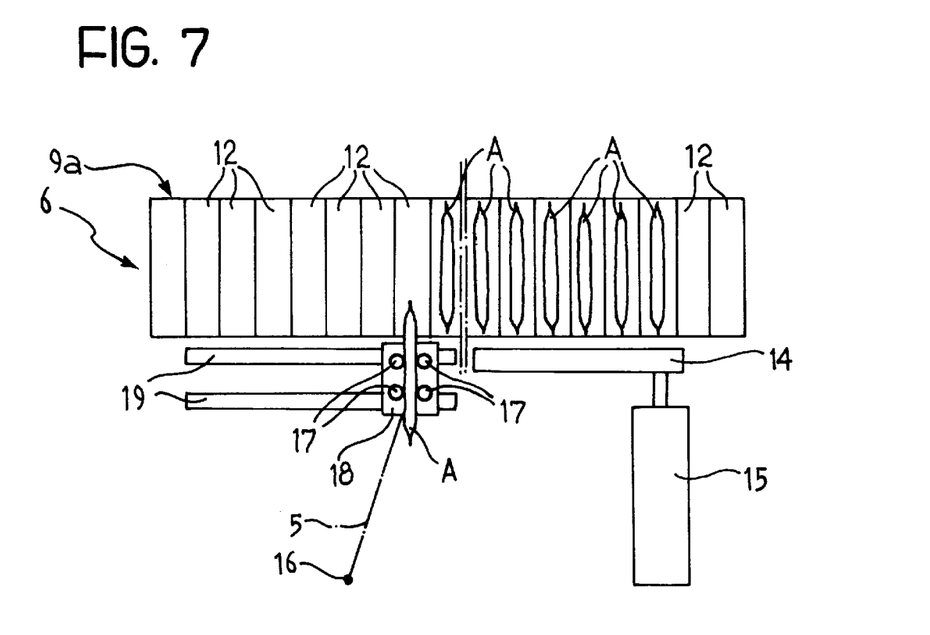

At this point, as soon as the trolley 18 has reached its maximum distance from the output position, the direction of rotation of the motor 20 is inverted, so that it will now also reverse the direction in which the trolley 18 moves along the guides 19 (see FIG. 6). In these conditions the downstream end of the input conveyor 5 begins—as it were—to run after the active branch 9a as it moves forward, though with a certain predetermined lag, thus continuing to load the incoming articles A into the appropriate beds 12 of the transfer conveyor 9. It keeps doing this until it reaches the position shown in FIG. 7, where a new group of articles A has reached the position in front of the pusher element 14 and is therefore ready for expulsion onto the output conveyor 7, while the trolley 18 carrying the downstream end of the input conveyor 5 is completing the operation of loading an article A into the appropriate receptacle 12 and is about to reach the forward limit of its travel as shown in FIG. 3.

When it reaches this position, the operating cycle that has just been described is repeated in exactly the same way as before, commencing from the position shown in FIG. 3.

It will in any case be appreciated that the kinematic separation that—in the previously described terms—exists between the transfer conveyor 9 and the input conveyor 5 makes it possible in actual practice for the latter, especially at its output end identified by the rollers 17 mounted on the trolley 18, to reach any relative position with respect to the beds 12 defined by adjacent pairs of baffles or fins 11. Put in other words, the output end of the conveyor 5 is capable of performing a relative movement with respect to the conveyor 9 that is continuous or substantially continuous and not subdivided into discrete steps corresponding, for example, to the dimensions of the beds 12.

This characteristic can be exploited—for example—for the purpose of enabling the device in accordance with the invention to function properly also when the articles to be handled are all made up of a plurality of individual products. For example, in the application context of a possible form of implementation of the invention to which reference has been made in the present exemplifying description, the articles that have to be stacked and compacted in the device 1 may each be made up of a stack of individual products, a case in point being such thin products as in current terminology are generally referred to as so-called "pantyliners".

The corresponding development of the invention will now be described by specific reference to FIGS. 8 and 9 of the appended drawings. The first of these, FIG. 8, may be considered as a view in the direction of the arrow VIII of FIG. 1, while FIG. 9 is essentially a plan view of the parts illustrated in FIG. 8 as seen from above.

Figure 8:
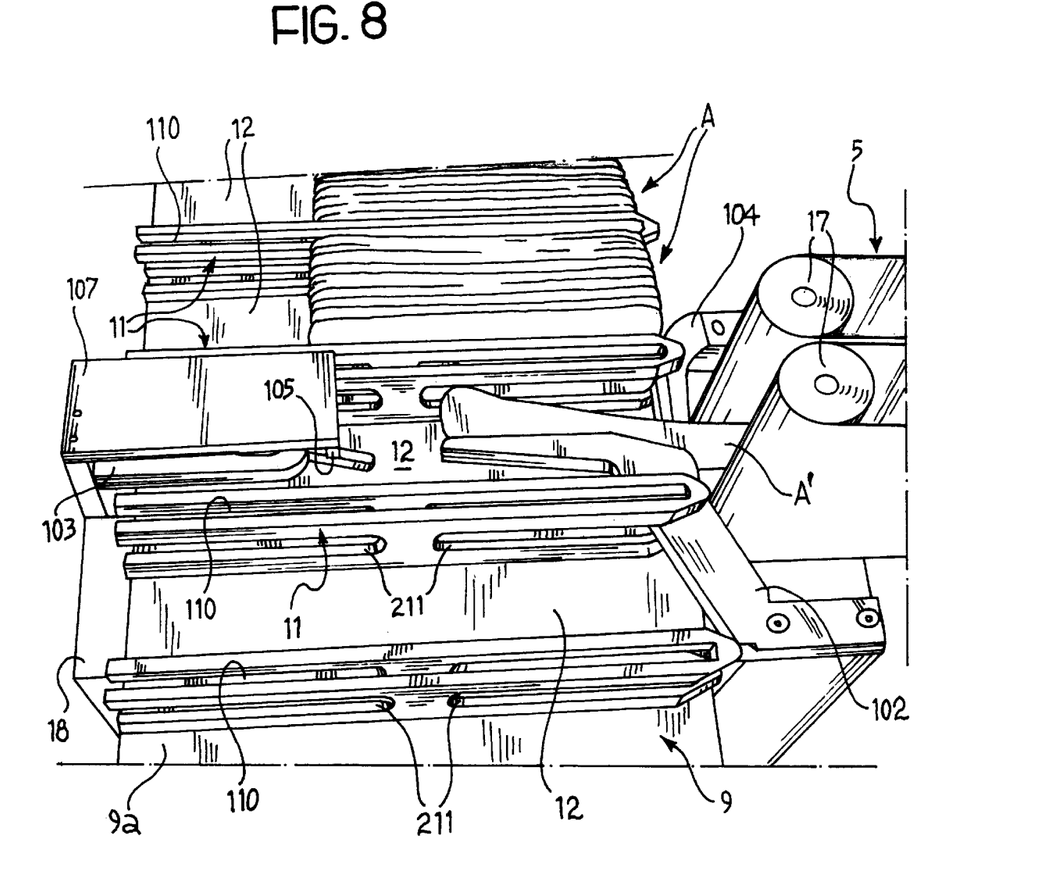
FIGS. 8 and 9 illustrate an advantageous development of the invention referring to a possible application in which the articles to be handled are in actual fact each made up of a plurality of individual products.
Figure 9:
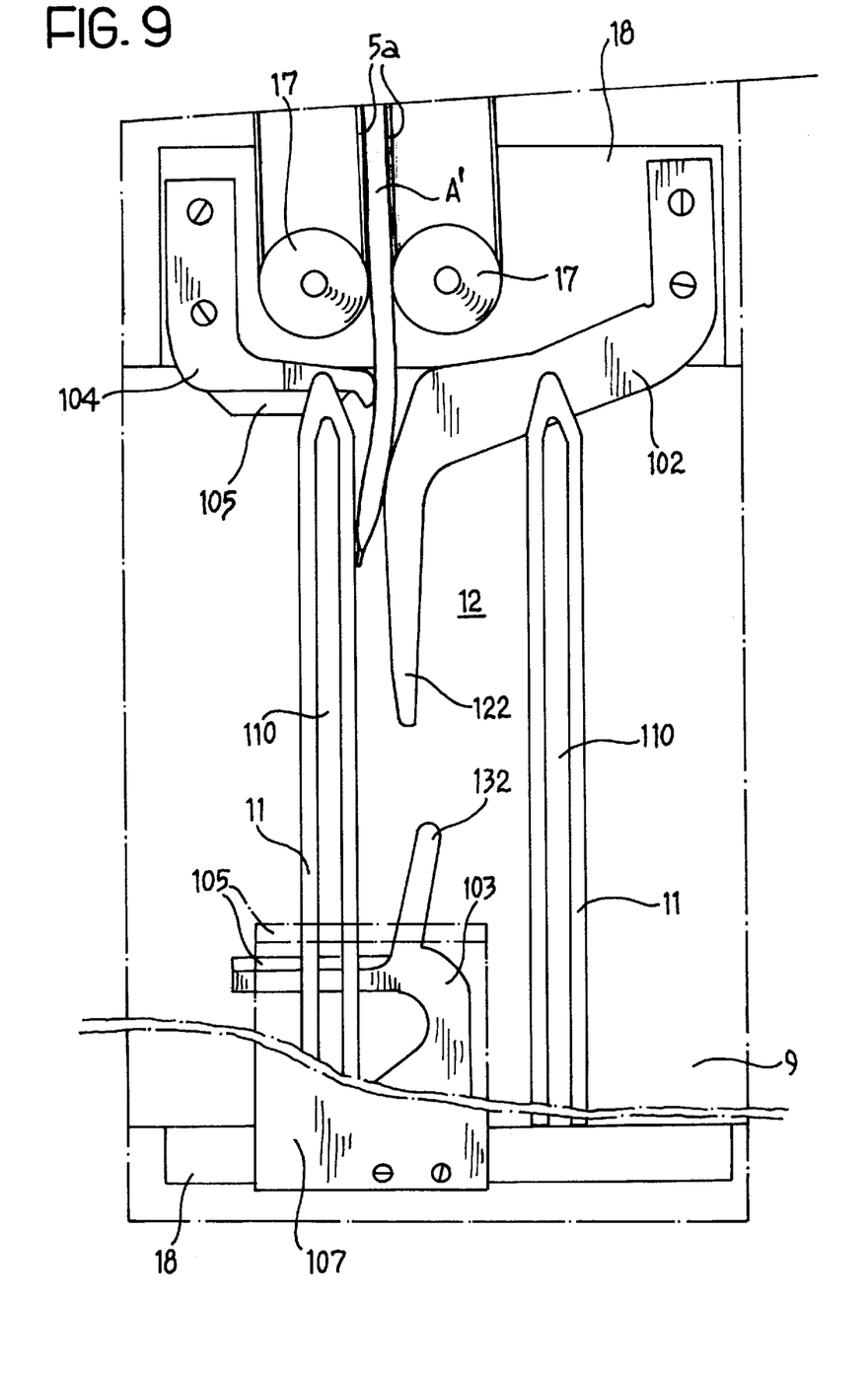

It should be made quite clear that a goodly part of the elements shown in FIGS. 8 and 9 (though with the exception, for example, of the previously described elements identified by the same reference numbers as appear in FIGS. 1 to 7) are not directly shown in the said FIGS. 1 to 7.

The reason for this is that FIGS. 8 and 9 are essentially intended to show how the structure of the previously described device 1 can be further developed to enable it to perform yet other operational functions.

A first such development concerns the possibility of realizing the baffles or fins 11 not as full laminar bodies (as illustrated, at least at the schematic level, in FIGS. 1 to 7), but as slotted elements that are provided with a longitudinal opening 110 that constitutes a furrow across each baffle 11 and—in its turn—is open at the end of the baffle 11 that faces the output conveyor 7. In actual practice, each baffle 11 in this possible implementation variant consists not of a single lamellar formation, but rather of two such lamellar formations placed side by side and therefore separated by the said opening or slot 110 and joined to each other in the manner of a fork at the end facing away from the conveyor 7, that is to say, at the end facing the input conveyor 5.

In the said longitudinal openings or slots 110 of the baffles 11 it is possible to insert (by means of a sheet-feeding device not shown in the figure, but of a known type) such laminar elements as labels, instruction sheets, etc., of such conformation as to project vertically, at least in part, beyond the outline of the baffles 11 and therefore subject to the action of the pusher 14. In this way the said lamellar elements will be pushed out—together with the articles A—towards the conveyor 7, so that they will become incorporated in the stacks of articles that are formed from time to time. When operating in this manner, in particular, it is possible to insert in the baffle 11 a label corresponding to the article in question and intended to occupy a head or top-end position in a stack that is being formed, so that the said label will eventually be superposed on the stack in a terminal position. Such a label can also be placed at the tail or bottom-end position of the stack to either substitute or supplement the top-end label.

Again, the same mechanism can be used to insert in the openings 110 (especially when the articles A to be handled are in their turn made up of a stack of products, as will be explained in greater detail further on) retrieved products, which in this manner can be re-inserted in the flow of products that is being handled.

The reference numbers 102, 103, 104 and 107 in FIGS. 8 and 9 indicate the respective profiles (made of plastic material or of some other light material) mounted on the trolley 18 in such a manner as to be to all intents and purposes united with the rollers 17 in the general transverse movement of the output end of the conveyor 5 controlled by the motor 20. The profiles in question, especially when examined in the plan view of FIG. 9, may seem such as to interfere with the baffles 11. In actual fact, however, when provision has to be made for the use of such profiles, the baffles 11 are designed with corresponding notches or cutouts 211 (which can be partly seen only in FIG. 8) that can be crossed horizontally by the profiles 102, 103, 104, 107 which—carried by the trolley 18 arranged generically below the belt of the active branch 9a of the conveyor 9—extend and act between the baffles 11 above the said belt.

The profiles 102, 104 jointly define a kind of pincer-like structure, with each profile constituting one of the jaws of the pincers. This structure is mounted on the trolley 18, by means of screwing, for example, in such a manner that the zone in which the two profiles move towards each other will in actual practice be aligned with the separation interval of the rollers 17. In this way the products A' (the reason for this different designation will become clearer further on) carried forward by the active branches 5a of the belts of the conveyor 5 come to insert themselves in the confluence space of the profiles 102 and 104 and subsequently move forward between the baffles 11 defining the bed 12 at that moment facing the conveyor 5. Preferably (as can be seen better in the plan view of FIG. 9) the pincer-like structure defined by the profiles 102 and 104 should be at least slightly unsymmetrical as a result of the correspondingly unsymmetrical shape of the profiles 102 or 104 in the said area in which they come together and/or the presence on one of the profiles (the profile 102 in the example here illustrated) of an appendage 122 that prolongs the profile and extends it to well inside the bed 12 at that moment being fed with the products A'.

The aforesaid non-symmetry is intended to make sure that the products A' will be pushed into the bed 12 in such a way as to come to rest close to one of the baffles 11 that define the said bed. In the specific case of the observation point of FIG. 9, the active branch 9a (and therefore the baffles 11) will move from right to left, so that the baffle 11 situated (always as seen from the observation point of FIG. 9) on the left-hand side of each bed will be on the "downstream" side of the baffle situated on the right-hand side of the same bed. The term "downstream" (and the complementary "upstream") have of course, to be understood in relation to the direction in which the active branch 9a of the conveyor 9 is moving.

The said unsymmetry of the profiles 102, 104 is thus intended to ensure that the products A' will come to rest against the particular baffle 11 that from time to time comes to be situated in the position of the downstream side of the bed 12 in question.

The structure just described makes it possible for very thin products A' (the so-called "pantyliners", for example) to be fed to the device 1 in such a way as to ensure that, passing between the profiles 102 and 104, these products will gradually become stacked in a given bed 12 with the stacking direction extending from the downstream side to the upstream side (always with reference to the direction of movement of the active branch 9a of the conveyor 9) of that bed. In this way it is possible to form in each bed 12 an article A intended to be subsequently handled as previously described with reference to FIGS. 1 to 7, where the said article A is in actual fact made up of a stack of thin products A' that have been grouped into a single bed 12.

Naturally, the aforesaid stacking of the products A' within a single bed 12 presupposes that the output end of the conveyor 5 and the profiles 102 and 104 associated with it (and therefore also the trolley 18) will be capable of performing a backward movement with respect to the bed that is being filled, as we have seen, from the downstream side to the upstream side. It must here be underscored that this backward movement is relative, because in actual fact it must be capable of becoming superposed on a general forward movement of the output end of the conveyor 5 when the latter is obliged to follow the active branch 9a of the conveyor 9 in its forward movement towards the pusher element 14.

The said relative backward movement can be obtained by appropriately intervening (in accordance with criteria that are in themselves well known and do not therefore have to be specifically explained) in the control unit 21.

The other two profiles 103, 107 are in actual practice constituted by a stirrup shaped roughly in the manner of an "L" and a kind of roof or shelf mounted on the trolley 18 in such a manner as to project above the profile 103. The latter is provided with an appendage 132 that extends in substantial alignment with the appendage 122 of the profile 102. This in such a way as to form a kind of pocket into which the products A' become gradually inserted with their forward ends as the operation of stacking them in the bed 12 proceeds. In particular, the appendage 132, which gradually moves away from the baffle 11 against which the products A' are being stacked as a result of the aforesaid relative backward movement of the trolley 18, gradually comes to contain the products A' of the stack that is being formed until the moment when the bed 12 is substantially full. The profile 107, on the other hand, has the function of ensuring that the products A' will become inserted below it, thereby avoiding the possibility of their becoming jerked upwards and preserving the alignment of the products A'.

Wads 105 of spongy or, in any case, yielding material are arranged in various positions on the previously described profiles that are exposed to the movement and/or impact of the products A' in order to avoid the said products A' becoming deformed and/or jerked.

Of course, even though the solution is usually not particularly easy to realize (because it is intrinsically in conflict with the overall buffer function that the device 1 has to perform), there is nothing that prevents the function of stacking the products A' within the individual bed 12 being performed by acting against the baffle 11 situated on the position on the upstream side, i.e. imposing upon the trolley 18 a relative forward movement with respect to the active branch 9a of the conveyor 9. In that case the arrangement of the profiles 102, 103, 104 and 107 will be symmetrically reversed as compared with the one just described and illustrated by FIGS. 8 and 9.

Without prejudice to the principle of the invention, of course, the realization details and implementation forms may differ very widely from what has just been described and illustrated without in any way going beyond the ambit of the present invention as defined by the claims attached hereto. Without the list being in any way limitative, this is particularly true as regards:

the specific realization modalities of the various motor-operated conveyors, including the input conveyor 5 and/or the output conveyors 7 and 8: these conveyors may be realized in forms other than the belt conveyors here described, preserving however itentical or equivalent operating characteristics, especially as regards the capacity of the downstream end of the input conveyor 5 to pursue the active branch 9a of the conveyor 9;

the realization of the transfer conveyor 9: indeed, it is quite obvious that a function similar or equivalent to the one described hereinabove can be realized with a conveyor provided with receptacles and comprising a structure other than a belt or band structure and/or a structure developing in a vertical direction, conserving however the intrinsic advantages deriving from the fact that the conveyor 9 can be readily replaced by a conveyor having different dimensional characteristics for the purpose of realizing a so-called "format change", using an appropriate release device for example, without there being any need for substantial interventions in the other parts of the device, and the fact that the articles A are fed to the conveyor 9 and subsequently discharged therefrom by causing them to move in the same direction and/or without changing their orientation;

the realization of the expulsion system comprising the pusher element 14; the latter is capable of being realized in an altogether different configuration. For example, by means of a rake structure with appropriate prongs, each intended to act on a particular article A; and/or the nature of the articles A, which may be of any kind whatsoever (and therefore constituted also by groups of products placed side by side in the manner better illustrated by reference to FIGS. 8 and 9), and also the possible orientation of these articles: in this connection it will be readily appreciated that the general vertical orientation and the generically flat conformation that have here been illustrated do not in any way constitute imperative or binding characteristics for the purpose of implementing the invention.

It will in any case be appreciated that the solution in accordance with the invention makes it possible to take account of the input flow rate in such a way as to optimize the accelerations and the speeds of the individual mobile elements. In particular, the choice (and the possibility) of moving the downstream end of the input conveyor 5 in a continuous or substantially continuous manner makes it possible to avoid intermittent movements of the transfer conveyor unit which is here represented by the belt conveyor 9, and thus avoiding also the consequential stressing of all the mechanical organs of the device, cause of a rapid deterioration of these parts. As regards the realization of the motor 20, it has been found that the use of a linear motor in place of, for example, a brushless motor implies the advantage that very high accelerations can be impressed upon the trolley 18.

The description given hereinabove brings out the fact that—in general terms—the relative enslavement of the conveyor 9 (active branch 9a) and the input conveyor 5 (traversing motion imposed by the trolley 18) follows the principle on the basis of which the branch 9a is enslaved to the trolley 18 in terms of speed, while the trolley 18, in its turn, is enslaved to the active branch 9a of the conveyor 9 in terms position.

What is claimed is:

1. In a device for handling articles, including a transfer conveyor with an active branch provided with seatings for receiving the articles, said transfer conveyor having associated with it first motor means to impress upon said active branch a forward movement between an input position and an output position for realizing the transfer of the articles contained in said seatings from said input position to said output position, the device including loading means on the input side capable of receiving a continuous flow of articles and transferring the articles of said input flow towards appropriate seatings of said active branch of the transfer conveyor; said loading means on the input side having associated with them second motor means to move said loading means on the input side with respect to said transfer conveyor in such a way as to enable them to:

follow said active branch of the transfer conveyor in said forward movement between said input position and said output position, and selectively vary the length of said active branch of the transfer conveyor comprised between said input position and said output position and thus permit the articles to accumulate on said active branch of the transfer conveyor while they are being transferred, the improvement wherein said transfer conveyor and said loading means on the input side are kinematically uncoupled from each other;

there are provided control means that act in a coordinated manner on said first and second motor means to realize said movement of following the active branch of the transfer conveyor in said forward movement between said input position and said output position to selectively vary the length of said active branch of the transfer conveyor comprised between said input and output positions.

2. The device of claim 1, including expulsion means located at said output position and capable of acting simultaneous on a group of said articles contained in said seatings of said active branch of the transfer conveyor to expel said group of articles from the transfer conveyor.

3. The device of claim 2, wherein that said loading means on the input side and said expulsion means are configured in such a way as to feed and expel said articles to and from, respectively, the said transfer conveyor by always moving them in the same direction.

4. The device of claim 2, wherein:

said transfer conveyor, said loading means on the input side and said expulsion means each have associated with them respective driving means and are provided with control means capable of acting on said several driving elements to:
  i) bring said transfer conveyor into a substantial standstill condition while said expulsion means expel from the transfer conveyor a group of said articles and said loading means on the input side continue to transfer articles of said input flow into the appropriate seatings of said active branch of the transfer conveyor by moving along said active branch away from said output position and thus to increase the length of said active branch of the transfer conveyor comprised between said input and said output position;
  ii) resume the forward movement of said active branch of the transfer conveyor after said expulsion means have expelled said group of articles from the transfer conveyor and displace said loading means on the input side along said active branch of the transfer conveyor to approach said output position and thus following the forward movement of the said active branch of the transfer conveyor.

5. The device of claim 1, wherein said loading means on the input side that said loading means include a representative conveyor with an upstream end and a downstream end in the direction of motion of the articles of said input flow; the said upstream end being mounted in a substantially fixed position, while said downstream end is associated with motor means capable of moving said downstream end in a direction substantially coextensive with at least an appropriate branch of said active branch of the transfer conveyor.

6. The device of claim 5, wherein said downstream end has associated with it supporting equipment capable of moving along guide formations that run substantially parallel to at least an appropriate branch of said active branch of the transfer conveyor.

7. The device of claim 6, wherein said mobile supporting equipment is made of low-inertia material.

8. The device of claim 6, wherein the transfer conveyor is provided with fin formations that define said reception seatings and wherein said mobile equipment is provided with an organ capable of locally raising the tract of the active branch of the transfer conveyor facing said mobile equipment to produce a divarication of the fin formations provided in said tract of the active branch.

9. The device of claim 1, wherein said loading means on the input side include a conveyor of the motor-operated belt type.

10. The device of claim 1, wherein the said loading means on the input side have a linear motor associated with them as the driving element.

11. The device of claim 1, including an associated output conveyor situated in a fixed position with respect to said transfer conveyor and at the output end thereof.

12. The device of claim 2, including, at said output position, means for exerting a compacting action on the articles comprised in said group.

13. The device of claim 1, including an associated output conveyor situated in a fixed position with respect to said transfer conveyor and at the output end thereof and, at said output position, means for exerting a compacting action on the articles comprised in said group, wherein said output conveyor is provided with conveyance formations that tend to converge in the flow direction of said articles, so that said output conveyor will realize said action of compacting the articles as they move forward on said output conveyor.

14. The device of claim 11, wherein said output conveyor is a motor-operated conveyor of the belt type.

15. The device of claim 2, wherein the expulsion means include a pusher element capable of performing a sideways motion in a direction that is generically transverse with respect to said active branch of the transfer conveyor.

16. The device of claim 2, wherein said transfer conveyor is provided with fin formations that jointly define said reception seatings for said articles and wherein said pusher element is configured in such a way as to act on the articles contained in said reception seatings in substantial absence of any interference with said fin formations.

17. The device of claim 2, wherein said expulsion means have associated with them an appropriate driving element capable of impressing different speeds upon said expulsion means during the movement to expel said group of articles from the transfer conveyor and also during the corresponding return movement.

18. The device of claim 1, wherein said transfer conveyor is a motor-operated ring conveyor that envelops the associated revolving bodies.

19. The device of claim 1, wherein said active branch of the transfer conveyor is provided with reception seatings for the articles having the general configuration of a channel that permit said articles to slide in a direction that is generically transverse with respect to said forward motion of the active branch of the transfer conveyor.

20. The device of claim 1, including expulsion means located at said output position and capable of acting simultaneous on a group of said articles contained in said seatings of said active branch of the transfer conveyor to expel said group of articles from the transfer conveyor and wherein the transfer conveyor is provided with fin formations that define said reception seatings and wherein said mobile equipment is provided with an organ capable of locally raising the tract of the active branch of the transfer conveyor facing said mobile equipment to produce a divarication of the fin formations provided in said tract of the active branch, said finned formations being provided with longitudinal openings for receiving laminar elements to be inserted in said groups of articles by virtue of the action of said expulsion means.

21. The device of claim 1, wherein:

said motor means can be operated by said motor means in such a manner as to impress upon said loading means on the input side a scanning movement relative to said active branch of the transfer conveyor such that the loading means on the input side become capable of performing a scanning movement relative to said reception seatings for the articles, and said loading means on the input side carry associated guide formations for sequentially feeding, due to said relative scanning movement, into each of said reception seatings a plurality of products that will jointly form an article received in one of said seatings.

22. The device of claim 21, wherein said guide formations have at least partly an unsymmetrical overall conformation, so that said products are inserted into said reception seatings in such a way as to be arranged on one of the sides of said reception seatings, with consequent stacking of said sequentially fed products.

23. The device of claim 22, wherein:

said relative scanning movement is realized in the direction opposite to the direction in which said active branch of the transfer conveyor is moving forward, and said guide formations steer said products towards the side of said reception seatings situated on the downstream side with respect to the forward movement of said active branch of the transfer conveyor.

24. The device of claim 21, wherein said guide formations include a pincer-like structure and the two jaws of said structure guide said products.

25. A device of claim 21, wherein said guide formations have at least partly an unsymmetrical overall conformation, so that said products are inserted into said reception seatings in such a way as to be arranged on one of the sides of said reception seatings, with consequent stacking of said sequentially fed products, and wherein said guide formations include a pincer-like structure and the two jaws of said structure guide said products, one of the jaws of said pincer-like structure being provided with an appendage that prolongs it and realizes said unsymmetrical conformation.

26. The device of claim 21, wherein said guide formations include at least one stirrup element that defines a pocket structure to receive said products.

27. The device of claim 25, said stirrup element having an appropriate appendage that is substantially coextensive with and points in the direction of said prolonging appendage.

28. The device of claim 21, wherein at least some of said guide formations have associated with them yielding elements to deaden the movement of said products.

* * * * *